Oct. 15, 1929.                T. R. PALMER                1,731,752

BATTERY BOX

Filed March 6, 1925

Inventor
Theron R. Palmer
By
Attorney

Patented Oct. 15, 1929

1,731,752

UNITED STATES PATENT OFFICE

THERON R. PALMER, OF ERIE, PENNSYLVANIA

BATTERY BOX

Application filed March 6, 1925. Serial No. 13,639.

This invention relates to hard rubber battery boxes. It is very desirable with such boxes to re-enforce them and accomplish this with the least possible amount of rubber in the interest of economy. The present invention is designed to effect this result and provide means by which the trade plate carrying the particulars of the battery may be readily attached. The invention also contemplates a convenient manner of supporting a bail in the box and also forming the handle for the box. Features and details of the invention will appear from the specification and claims.

The invention is illustrated in the accompanying drawings as follows:—

Figure 1:
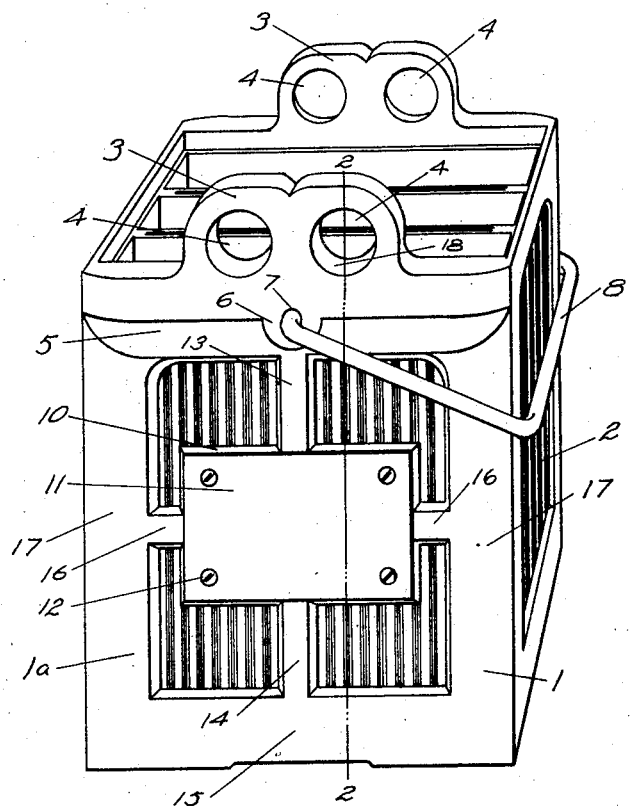
Figure 2:
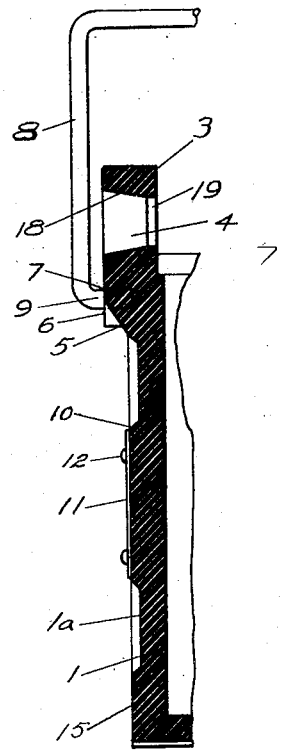

Fig. 1 shows a perspective view of the box.
Fig. 2 a section on the line 2—2 in Fig. 1.

The box is formed as a container and comprises the ends and sides 1 and 2 respectively. The box has the handle projections 3 formed integrally therewith with finger openings 4.

Immediately below the handles the ends of the box have a re-enforcing rib 5. This has a slight projection 6 at the center in which is arranged a perforation 7. A bail 8 is provided with the inturned ends 9 which extend into the perforation 7 so that the battery may be readily carried with the bail. The problem of such a bail with a battery box made of hard rubber is to get sufficient support for the bail to carry the rather heavy load formed with the loaded battery. By placing the perforations in the re-enforcing rib 5 a support sufficient for this purpose may be had and this is particularly true where the perforation is placed below the portion of the handle separating the openings 4.

The end is formed with a depressed panel 1ª and a raised plate base 10 is formed within the panel 1ª. The trade plate 11 is secured to the base 10 by screws 12 which extend into the base 10, the projecting base giving sufficient thickness to the walls to receive the screws. The base 10 is utilized as a portion of the plan for re-enforcing the end, being connected by ribs 13 with the re-enforcing rib 5 directly under the perforation 7. The base 10 is connected by a rib 14 with the bottom rib 15 of the end and is connected by a rib 16 with the side ribs 17, the ribs 5, 15 and 17 forming surrounding ribs for the panel.

In forming finger openings some draught must be provided for the mold and in consequence such openings are formed tapered being larger at their outer edges, this tapered portion being represented in Fig. 2 at 18. This tapered opening, however, if carried to the inner face of the box forms a sharp edge which with the load of the box tends to cut the hands of the operator. This is avoided in the present invention by forming a small portion immediately adjacent to the inner face at 19 of cylindrical form. In this short space the molds can be readily withdrawn and the rather round edge of cylindrical form avoids the cutting action of the all tapered opening.

What I claim as new is:—

1. A battery box comprising ends having re-enforcing ribs on their outer faces with bail perforations in the re-enforcing ribs; handles formed integrally with the ends and extending upwardly from the ribs, said handles having two finger holds with a separation between the holds directly above the perforations; and a bail having its ends secured in the perforations.

2. A battery box comprising an end having a handle projection formed integrally therewith with a handle opening tapered from the outer face inwardly to a point adjacent to the inner face of the projection and formed with parallel surfaces adjacent to the inner face.

In testimony whereof I have hereunto set my hand.

THERON R. PALMER.